US00RE36067E

United States Patent [19]

Ringe et al.

[11] E Patent Number: Re. 36,067

[45] Reissued Date of Patent: Jan. 26, 1999

[54] R-T-E CEREAL WITH PSYLLIUM

[75] Inventors: Mitchell L. Ringe; James R. Stoll, both of Maple Grove, Minn.

[73] Assignee: Kellogg Company, Battle Creek, Mich.

[21] Appl. No.: 547,679

[22] Filed: Oct. 18, 1995

Related U.S. Patent Documents

Reissue of:

[64] Patent No.: 5,026,689
Issued: Jun. 25, 1991
Appl. No.: 330,245
Filed: Mar. 29, 1989

U.S. Applications:

[63] Continuation of Ser. No. 924,918, Aug. 5, 1992, abandoned.

[51] Int. Cl.[6] ..... A23L 1/42; A23L 1/29; A21D 8/00; A21D 13/00

[52] U.S. Cl. ..... 514/57; 424/439; 424/441; 426/2; 426/3; 426/560; 426/620; 426/621; 426/800; 426/804; 426/808; 514/54

[58] Field of Search ..... 424/195.1, 439, 424/441; 426/2, 3, 800, 804, 808, 560, 621; 514/54, 57

[56] References Cited

U.S. PATENT DOCUMENTS

| | | | |
|---|---|---|---|
| 3,148,114 | 9/1964 | Fahrenbach et al. | 424/195.1 |
| 3,708,306 | 1/1973 | Appleman | 426/630 |
| 3,732,109 | 5/1973 | Poat et al. | 426/620 |
| 3,876,811 | 4/1975 | Bonner et al. | 426/621 |
| 4,321,263 | 3/1982 | Powell | 424/195.1 |
| 4,348,379 | 9/1982 | Kowalsky | 424/442 |
| 4,459,280 | 7/1984 | Colliopoulos et al. | 424/493 |
| 4,496,606 | 1/1985 | Michnowski | 426/573 |
| 4,568,557 | 2/1986 | Becker et al. | 426/618 |
| 4,619,831 | 10/1986 | Sharma | 426/93 |
| 4,698,232 | 10/1987 | Sheu et al. | 426/572 |
| 4,759,942 | 7/1988 | Von Fulger | 426/621 |
| 4,766,004 | 8/1988 | Moskowitz | 426/658 |
| 4,777,045 | 10/1988 | Vanderveer et al. | 424/195.1 |
| 4,784,861 | 11/1988 | Gori | 426/74 |
| 4,789,664 | 12/1988 | Seligson et al. | 514/23 |
| 4,824,672 | 4/1989 | Day et al. | 424/195.1 |
| 4,861,614 | 8/1989 | Seaborne | 426/621 |
| 4,877,627 | 10/1989 | Leitz et al. | 426/804 |
| 4,915,960 | 4/1990 | Holmgren | 426/804 |
| 4,950,140 | 8/1990 | Pflaumer et al. | 426/804 |
| 4,961,937 | 10/1990 | Rudel | 426/552 |

FOREIGN PATENT DOCUMENTS

| | | |
|---|---|---|
| 1221575 | 5/1987 | Canada . |
| 68229 | 1/1983 | European Pat. Off. . |
| 166825 | 9/1988 | European Pat. Off. . |
| 306469 | 3/1989 | European Pat. Off. . |
| 309029 | 3/1989 | European Pat. Off. . |
| 2201875 | 9/1988 | United Kingdom . |
| 88/08257 | 11/1988 | WIPO . |
| 89/02225 | 3/1989 | WIPO . |

OTHER PUBLICATIONS

Industrial Gums–Polysaccharides and Their Derivatives, Quince, Psyllium, Flax Seed, and Okra Gums, II. Psyllium Seed Gum, 345–354 (Roy Whistler 2d ed.), 1973.

R.W.Schery, Plants for Man, 319 (Prentice Hall Inc., 2nd ed.), 1973.

T. Tanaka, Tanaka's Cyclopedia of Edible Plants of the World, 563–564 (Keigaku Publishing Co.), 1976.

The United States Pharmacopiea, 20th ref., The National Formulary, 15th ed., 915, 929 (United States Pharmacopieal Convention, Inc.), 1980.

P. Judd, Comparison of the Effects of High abd Low–Methoxyl Pectics on Blood and Faecal Lipids in Man, 48 British Journal of Nutrition, 451–458, 1982.

E. Lund, Cholesterol Binding Capacity of Fiber from Tropical Fruits and Vegetables, 19 Lipids 85–90, 1984.

J. Thomas, Alteration of Regression of Cholesterol Accumulation in Rats by Dietary Pectin, 51 British Journal of Nutrition 339–345, 1984.

C. Morris, A Closer Look at Dietary Fiber, Food Engineering, 132–140, 1985.

J.K.C. Chan et al., A Forgotten Natural Dietary Fiber: Psyllium Mucilloid, vol. 33, No. 11, Cereal Foods World, 919–922, 1988.

L. Prosky, Determination of Insoluble, Soluble, and Total Dietary Fiber in Foods and Food Products: Interlaboratory Study, 71 J. Assoc. Off. Anal. Chem. 1017–1023, 1988.

Meer Corporation, Technical Information, Psyllium Husks, undated.

*Primary Examiner*—John Kight
*Assistant Examiner*—Howard C. Lee
*Attorney, Agent, or Firm*—Fulbright & Jaworski, LLP

[57] ABSTRACT

Disclosed are ready-to-eat cereals containing high levels of psyllium husk and methods for their preparation. The cereals contain about 2% to 37% psyllium, about 20% to 80% of a starchy cereal component, and about 5% to 15% insoluble fiber. The weight ratio of soluble to insoluble fiber ranges from about 1 to 5:1. The total fructose content is less than about 5%. The minimum soluble fiber content is 3 g/oz.

32 Claims, No Drawings

R-T-E CEREAL WITH PSYLLIUM

Matter enclosed in heavy brackets [ ] appears in the original patent but forms no part of this reissue specification; matter printed in italics indicates the additions made by reissue.

*This application is a continuation of application Ser. No. 07/924,918, filed Aug. 5, 1992, now abandoned, which is a reissue of U.S. Ser. No. 07/330,245 filed Mar. 29, 1989 now U.S. Pat. No. 5,026,689.*

BACKGROUND

1. Field of the Invention

The present invention relates to food products and to their methods of preparation. More particularly, the present invention relates to high fiber, ready-to-eat ("R-T-E") cereal products and to their methods of preparation.

2. Background of the Invention

R-T-E cereals are popular packaged goods food items. R-T-E cereals exist in large numbers of varieties. R-T-E cereals, especially whole grain, are known as good sources of fiber. A good description of the literature pertaining to the health discussion on the role of fiber is found in U.S. Pat. No. 4,777,045 (issued Oct. 11, 1988 to Vanderveer et al. and is entitled High Bran Snack) which is incorporated herein by reference. In view of the health interest in fiber, high fiber cereals are increasingly popular. These cereals contain added levels of fiber sources, especially corn and wheat bran, and range generally from about 2–5 g fiber/oz cereal. Generally, the fiber is predominantly of the insoluble type. Some cereals are formulated from all bran sources and can contain up to 8–10 g/oz fiber. High fiber cereals using purified insoluble fiber sources and artificial sweeteners can even contain as high as 8–13 g fiber/oz of cereal.

While popular, high fiber cereals are not without disadvantages. The primary concern is with the organoleptic qualities of the R-T-E cereal. Generally, as the concentration of fiber increases, the starchy components decrease, adversely affecting the cereals organoleptic and physical properties. High fiber cereals are often dry, exhibit short bowl lives and yield highly frangible food pieces. Second, while most fiber rich R-T-E cereals have higher levels of insoluble fibers, present consumer interest is focused upon cereals containing oat bran which is a rich source of soluble fiber. There is a growing awareness of the health benefits to people associated with soluble fiber consumption, especially reductions in blood serum cholesterol, i.e., antihypercholesterolemic benefits. Unfortunately, cereals high in soluble fibers typically are gummy or slimy upon consumption.

The present invention is directed towards the provision of a high fiber R-T-E cereal with superior organoleptic attributes or qualities. Surprisingly, the present invention provides such a superior quality high fiber R-T-E cereal which nonetheless contains a high concentration of soluble fiber. Moreover, in preferred embodiments, the present cereal compositions provide high fiber cereals having soluble fiber predominating. The present invention resides in part in the particular selection of psyllium as the soluble fiber source.

Psyllium is a well known material long used as a bulk fiber source in laxative compositions to be added to liquids (see, for example, U.S. Pat. No. 4,459,280, issued Jul. 10, 1984, to Colliopoulos et al. and which is incorporated herein by reference). Moreover, psyllium husk rich fiber supplement compositions are known (U.S. Pat. No. 4,766,004, issued Aug. 23, 1988, to Moskowitz entitled Crunchy, Highly Palatable, Bulk-Increasing, Dietary Fiber Supplement Composition) discloses a crunchy psyllium-containing composition comprising a flavored, sweetened, vegetable fat and optionally other fibers.

Other high fiber food products containing other fiber sources are well known. For example, U.S. Pat. No. 4,568,557, to Becker et al., discloses a snack food product prepared by premixing a dietary fiber with a food grade oil; premixing a compound coating containing a fractionated fat, sweetener, milk solids, yogurt, and a flavoring agent; blending the two pre-mixtures and adding a cereal product to obtain texture and a dried fruit or nut for flavor; and extruding the resulting mixture into a desired shape.

European patent application No. 0068229, to Kleinert, discloses the addition of the seed coats (episperm) of cocoa beans in finely powdered form, to dough, bread, snacks, and chocolate to increase bulk and stimulate the intestinal tract.

U.S. Pat. No. 4,348,379, to Kowalsky, discloses a dietetic composition for natural digestion regulation containing whole fleawort seeds (Semen psyllii totum) whole linseed, wheat bran, lactose, a binding agent based on natural rubber, flavor and food color additives. The preferred binding agent is gum arabic.

While these references disclose compositions of improved palatability, the taste of most products, especially R-T-E cereals, containing a sufficient amount of fiber, especially soluble, to be efficacious continues to be a problem. Those products which are particularly rich in fiber generally employ a fat or oil to increase the palatability of the products to mask partially the dryness and/or grittiness of most fiber sources. Thus, it is quite surprising that whole psyllium husks, when admixed with other fiber sources and a starchy cereal component will provide a crunchy, organoleptically pleasing efficacious R-T-E cereal which does not require high levels of a fat ingredient. In one method aspect, the present invention provides methods for preparing such novel R-T-E cereal products. In another method aspect, the present invention resides in methods for reducing people's blood serum cholesterol by a regimen of once daily consumption of the present R-T-E cereals.

SUMMARY OF THE INVENTION

The present invention provides cereal compositions and R-T-E cereals fabricated therefrom as well as to methods for preparing such R-T-E cereals. The cereal compositions essentially comprise psyllium husk, a starchy cereal component, and an insoluble fiber source. The cereal contains at least 3 g/oz of soluble fiber. The cereal composition is further defined by the weight ratio of soluble to insoluble fiber and maximum fat and fructose levels. Notwithstanding higher concentrations of water soluble fiber and the absence of added fat, the R-T-E cereals are organoleptically desirable. The R-T-E cereal products are further essentially defined by limited concentrations of fructose. In another embodiment, the present invention provides oat or oat bran R-T-E cereals fortified with respect to soluble fiber content by incorporation therein with psyllium.

In one method aspect, the present invention resides in methods for preparing the present, high soluble fiber and psyllium containing R-T-E cereal. The methods essentially comprise blending the cereal ingredients with controlled amounts of water, cooking the mixture to form a cooked cereal, forming the cooked cereal into a cooked cereal dough with low shear mixing, and forming the cereal dough into pieces and drying the cereal pieces to form the present R-T-E cereals.

In another method aspect, the present invention resides in methods for reducing the blood serum cholesterol in humans comprising the oral administration in humans of effective amounts of the present R-T-E cereals. Typical dosages range from about 0.8 to 1.5 g/kg of R-T-E cereal in once to thrice daily dosages to achieve blood serum cholesterol reductions of 5% to 20%.

DETAILED DESCRIPTION OF THE INVENTION

The present invention relates to R-T-E cereals containing high levels of psyllium to methods for their preparation and to methods of reducing blood serum cholesterol by consumption of such cereals. In addition to conventional cereal ingredients, the present cereals additionally comprise psyllium and insoluble fiber sources. Each of these product constituents, as well as their method for preparation and use are described in detail below. Throughout the specification and claims, percentages are by weight and temperatures in degrees Fahrenheit, unless otherwise indicated.

Psyllium seed gum is well known and has a long history of use by humans and is a staple of commerce. The sourcing and use of psyllium is well described in various sources including Industrial Gums: Polysaccharides and Their Uses, second edition, edited by Whistler et al., Academic Press, NY 1973, more briefly in the United States Pharmacopeia, 12th edition: The National Formulary, 15th edition, The United States Pharmacopeia Convention Inc., Jul. 1, 1980, page 915, page 929, Plants for Man, second edition, by R. W. Schery, Prentice Hall Inc., 1973, page 319. See also, U.S. Pat. Nos. 4,321,263 (issued Mar. 23, 1982 to Powell), 4,459,280 (issued Jul. 10, 1984 to Colliopoulos et al.), and 4,766,004 (issued Aug. 3, 1988 to Moskowitz), each of which is incorporated herein by reference.

Generally, psyllium husks are the clean, dried seed coat material which is separated by whinnowing and thrashing from the seeds of Plantago ovata, known in commerce as blanc psyllium, Indian psyllium or ispaghula. French (black) psyllium comes from Plantago indica and occasionally from Spain as well. Both psyllium seed and psyllium husk are classified as bulk forming laxatives. As used in the present invention, the noun "psyllium" is meant to refer to psyllium husks and not to psyllium seed or to psyllium seed gum. Psyllium seed gum is not intended to be embraced herein by the term "psyllium."

Psyllium, or synonomously psyllium husks, as noted briefly above, is prepared by abraiding psyllium seed to separate the psyllium husk or mucilage from the seed core. Psyllium husk is available in various commercial grades. First cut or highest grade psyllium is preferred due to its higher concentration of water soluble fiber. However, first cut psyllium or high grade psyllium is more expensive. Second cut, or blends of first cut with second cut, are less desirable due to their lower soluble fiber content but, generally, are nonetheless more preferred for use herein due to their lower cost/value relationship.

The present cooked cereal compositions essentially comprise sufficient amounts of psyllium alone, or in combination with other soluble fiber providing components, so as to provide the cereal compositions with a soluble fiber content of at least 3 g/oz. In the practice of the present invention, good results are obtained when the first pass (a purity level of about 95%) or second pass psyllium (about 85% purity) comprises about 2% to about 37% of the cereal composition in order to obtain the benefits of good organoleptic properties together with the advantages of dietary fiber. Better results in terms of balancing the health benefits efficacy, especially antihypercholesterolemic activity, balanced with acceptable organoleptic attributes are obtained when the psyllium is present at a concentration range of from about 5% to 15% by weight of the cereal, and for best results about 9%. Generally, higher amounts of second pass, lower soluble fiber content psyllium are needed than when first pass psyllium with a higher soluble fiber content is employed.

When psyllium is used alone as the principle soluble fiber, i.e., when neither significant levels of pectin, oat bran or oat flour or other concentrated soluble fiber sources are employed, then the R-T-E cereals essentially comprise about 15% to 37% psyllium in order to provide sufficient amounts of soluble fiber to realize at least 3 g/oz soluble fiber.

Another essential component of the present cereal compositions is a starchy cereal(s). The cereal component can comprise any conventionally employed starchy cereal or, synonomously, farinaceous material, for use in a ready-to-eat cereal. Exemplary suitable starchy cereals include cereal flours from wheat, rice, corn, oats, barley, rye, or other cereal grains and mixtures thereof. The flours can be whole flours or flour fractions such as with the germ fraction or husk fraction removed. Of course, the R-T-E cereal art is well developed and the skilled artisan will have no difficulty selecting suitable farinaceous materials for use herein. The starchy cereal component can comprise from about 20% to 80% of the cereal composition. Better results in terms of organoleptic attributes and reductions in R-T-E cereal piece frangibility are obtained when the starchy cereal fraction comprises about 30% to 70% of the composition. For best results the starchy cereal fraction comprises about 40% to 50% of the present cereal compositions.

It is important that the present cereal compositions have an insoluble fiber component as well as a soluble fiber component. High concentrations of soluble fibers in R-T-E cereal compositions can, however, result in undesirable organoleptic attributes including upon consumption a slimy or gummy texture. Of course, utilization of cereal flours as described above will provide R-T-E cereal compositions with some insoluble fiber concentration, particularly when whole grain, e.g., whole wheat, flours are employed. The skilled artisan will appreciate that minor amounts of soluble fiber are associated with most cereal grains with the exception of oat flour or oat bran which provides comparatively high levels of soluble fiber. Generally, however, it has been found necessary to incorporate into the R-T-E cereal composition supplemental materials which are rich in insoluble fiber. Such addition is desirable in order to achieve the weight ratios of soluble to insoluble fibers surprisingly found to be essential and effective for the realization of high fiber R-T-E organoleptically superior cereals of the present invention.

Suitable materials for use herein as insoluble fiber sources are well known and the skilled artisan will have no difficulty in selecting materials suitable for use herein. Especially useful herein as sources of insoluble fiber are cereal brans including wheat bran, corn bran, rice bran, oat bran, rye bran, barley and mixtures thereof. It will be appreciated that such sources may also contribute minor amounts of soluble fiber as well. Also useful herein are noncereal fiber sources including cellulose flour, cellulose fiber, sugar beet fiber, etc. Sugar beet fiber can comprise up to 80% total dietary fiber with about 20% soluble fiber and 60% insoluble fiber. Sufficient amounts of these materials are used so as to achieve the weight ratio of soluble to insoluble fibers herein.

The measurement of total dietary fiber, soluble fiber, and insoluble fiber is subject to disparate analytical methods and values determined thereby. For purposes of the present invention, "soluble" and "insoluble" fiber values are to be determined by an accepted test procedure for fiber developed by Prosky et al. and described in "Determination of Insoluble, Soluble and Total Dietary Fiber in Foods and Food Products," Journal of the Association of Official Analytical Chemists, Vol. 71, No. 5 (1988) which is incorporated herein by reference. The procedure there described involves an enzymatic-gravametric procedure adopted by final action of the AOAC.

The present R-T-E cereal compositions can include additional or supplemental sources of soluble fiber in addition to psyllium. One possible, although expensive, source of soluble fiber is to employ commercially available high methoxyl pectin. While desirable due to its cost and availability, the utilization of pectin aggravates the problems of providing organoleptically acceptable cereal products. Accordingly, when pectin is used to provide additional soluble fiber, generally lower ratios of soluble to insoluble fiber are preferred. Other useful sources of soluble fiber include oat bran, guar gum, carboxymethyl cellulose and mixtures thereof. If present, each of these supplemental soluble fiber sources can comprise from about 0.1% to 60%, and, preferably, when used in addition to oat bran, about 1% to 5% of the present compositions.

Additionally, the present cereal compositions can include oat bran. Furthermore, oat bran has a fiber fraction in addition to the high cereal or starchy fraction. Oat bran is a concentrated source of a soluble fiber and can comprise at least 6% soluble fiber (about 1.7 g/oz) as well as at least 6% insoluble fiber (about 1.7g/oz). Accordingly, inclusion of oat bran into the present R-T-E cereal composition simultaneously can provide the present essential starchy cereal component, a soluble fiber component, and an insoluble fiber component. The soluble to insoluble fiber ratio of oat bran is approximately 1:1. The oat bran can comprise from about 10% to about 60% of the cereal composition. Better results in terms of organoleptic attributes are obtained when the oat bran comprises from about 12% to about 50% by weight of the composition, and for best results about 40%. Thus, in one embodiment, the present invention provides an oat flour and/or oat bran R-T-E cereal fortified with respect to soluble fiber by inclusion of psyllium when oat flour and/or oat bran is the major starchy cereal component.

For good results, the soluble to insoluble fiber ratio ("S/I" ratio) of the present R-T-E cereals can range from at least about 0.5:1. When pectin is employed as a secondary soluble fiber source, the S/I ratio is essentially at least 0.8:1. Better results are obtained when the S/I ratio is at least 3:1.

If desired, the present R-T-E cereal composition can additionally comprise about 0.1% to about 30% by weight sugar(s) or, synonomously herein, nutritive carbohydrate sweetening agents. Such materials are also well known in the R-T-E cereal art. Useful herein as the sugar component is sucrose. However, the sugar(s) component can additionally comprise conventional fructose, maltose, dextrose, honey, fruit juice solids, brown sugar, and the like. In addition to providing desirable sweetness, the sugar component additionally beneficially affects the cereal color and texture. Better results are obtained when the sugar(s) component comprises from about 5% to about 15% by weight of the composition. Sucrose can be added to the cereal composition, as a sugar coating, or both.

However, it is important that the total fructose content of the R-T-E cereal, including fructose contained in the cereal composition as well as the fructose fraction of any sucrose collectively be limited to less than about 15% of the R-T-E cereal. It has surprisingly been found that fructose appears to adversely affect the antihypercholesterolemic efficacy of the soluble fiber content. This restriction of fructose content includes both any fructose in the base cereal and any fructose associated with any sugar coating. Preferably, the fructose content is restricted to less than about 15% of the R-T-E cereal piece and to less than about 15% of the present cereal compositions. If desired, the R-T-E cereal can be fabricated with other nutritive carbohydrate sweetening agents alone or in combination in order to obtain the desired taste and texture without excessive sucrose usage.

The present cereal compositions are further essentially defined in part by low fat levels, i.e., the present cereals do not comprise added fat. Thus, the total fat or lipid component is quite low. The fat content results from the native fat associated with the starchy cereal component(s) and the psyllium. Permissible low fat additions can also result from adding emulsifiers and from vitamin or flavor addition. However, the total fat content of the cereal compositions should be less than about 4%, preferably less than about 4%. Preferably, the R-T-E cereal is substantially free of any externally applied fat or oil.

If desired, the present R-T-E cereal composition can additionally include a variety of materials designed to improve the aesthetic, organoleptic or nutritional qualities of the cereal. These adjuvant materials can include vitamin and/or mineral fortification, colors, flavors, high potency sweetener(s), and mixtures thereof. The precise ingredient concentration in the present cereal composition will vary in known manner. Generally, however, such materials can each comprise about 0.01% to about 2% by weight of the cereal composition.

One especially useful material is common salt. Desirably, the salt comprises about 0.1% to 2%, preferably about 0.5% to 1.0% of the cereal composition.

Still another highly preferred ingredient is a malt syrup flavor ingredient. The malt syrup comprises about 1% to 8% (dry basis), preferably about 2% to 5%.

Fiber, especially insoluble fiber, is believed to affect adversely selected mineral and vitamin absorption. Accordingly, in highly preferred embodiments, in particular, the present R-T-E cereals can be fortified with bioavailable sources of calcium, iron, riboflavin and the like. These mineral fortifiers can be incorporated into the cereal compositions directly. It is also desirable to vitamin fortify the present R-T-E cereals, especially selected B vitamins, e.g., riboflavin. Conventional methods and techniques of vitamin fortification can be used herein. Due in part to their heat sensitivity, vitamin fortification is typically practiced by topical application to the R-T-E cereal and such a technique is preferred herein.

The present cereal compositions can be cooked and prepared into ready-to-eat cereals by conventional cereal preparation methods. However, it is important in the cereal preparation that care be taken to avoid high shear mixing of the components, especially during dough formation. That is, during admixture or cooking, only low shear blending should be employed. High shear treatment of the soluble fiber also appears to adversely affect the efficacy of the soluble fiber. Thus, those cereal preparation methods and equipment designed to provide high shear cooking of cereal doughs, e.g., twin screw extruders or high shear single extruders, are, in preferred embodiments, to be avoided.

The present invention further resides in cereal preparation process useful in preparing the present R-T-E cereals. The present invention essentially comprises a first step of forming a dry blend of the cereal components and blending them to form an homogeneous blend. If significant amounts of wet ingredients are to be employed, then this first step may involve the substeps of first preparing separate mixtures of the dry and the wet ingredients and then combining the dry mixture with the wet mixture. The homogeneous blend is then combined with controlled amounts of water and cooked in a conventional manner for cereal dough cooking such as with a batch, atmospheric cooker or a low pressure extruder cooker especially those equipped with a conditioner precooker. The cereal is cooked with steam and sufficient amounts of added water for times and at temperatures sufficient to gelatinize the cereal starch and to develop desired levels of cooked cereal flavor.

The total moisture addition is controlled to provide a cooked cereal comprising about 20% to 60% moisture, preferably about 25% to 35% moisture. Excessive moisture addition can result in excessive water absorption by the fiber component. Such excessive water absorption not only can result in processing and handling problems, but also, and more importantly, in adversely affecting the mouthfeel and texture of the present R-T-E cereals. The cooked cereal is formed into a dough by an extruder and extruded to form cooked cereal dough extrudate ropes. It will be appreciated by the skilled artisan that cereal processing equipment and techniques allow for the combining of the cereal cooking and dough formation steps and such practices are contemplated as useful herein. Next, the cooked cereal dough is essentially formed into shapes and sizes as desired. For example, the ropes can be cut into pellets ranging in size of from about 40–70/10 g. These pellets can then be flaked to form flakes on the next essential step. The cereal dough pieces are then dried to form the present R-T-E cereals. For example, the flakes can then be toasted to flavor and partially puff the cereal pieces as well as to dry to the described low moisture contents. Optionally, the toasted flakes can be sugar coated and/or topically vitamin fortified. The R-T-E cereal pieces so prepared can then be conventionally packaged for distribution and sale.

The R-T-E cereal pieces so fabricated have relatively low water activities ranging typically from about 0.10 to 0.15 reflecting moisture contents ranging from about 1% to 3%.

The present cereal compositions can be fabricated into any of a variety of common R-T-E cereal forms including, shreds, biscuits, flakes, or any common R-T-E cereal form, shape or size. The present cereal compositions can also be formulated and fabricated so as to provide puffed cereals of various shapes and sizes. Especially desirable for use herein are flakes, especially toasted flakes.

If desired, the present cereal compositions can be fabricated into presweetened R-T-E cereals such as by the topical application of a conventional sweetener coating. Both conventional sugar coatings and coatings employing high potency sweeteners, especially aspartame and potassium acesulfame, are known and can be used to provide presweetened cereal for use herein. Care, however, should be taken to respect the fructose concentrations described above.

The present R-T-E cereal pieces are further essentially characterized by high levels of soluble fiber. The present R-T-E cereals essentially comprise at least 3 g/oz of soluble fiber. Preferred cereals are essentially further defined by soluble fiber contents ranging from about 4 to 6 g/oz of soluble fiber. For best results, the soluble fiber content is about 12%. Good results are obtained and the present compositions essentially are defined when the cereal compositions comprise about 11% to 30% soluble fiber (3 to 8 g/oz). Preferred compositions comprise about 11% to 21% soluble fiber (3 to 6 g/oz).

The R-T-E cereals of the present invention can be consumed in a conventional manner to obtain the nutritional and physiological benefits of a high soluble fiber cereal food. In particular, it has been surprisingly discovered that the present cereal compositions when consumed regularly in prescribed dosage amounts can be used, and thus provide the additional benefit, of antihypercholesterolemia. That is, for persons having elevated levels of blood serum cholesterol, consumption of the present R-T-E cereals effectively lowers their blood serum cholesterol. The present methods essentially comprise the oral administration of about 0.8 to 1.5 g/kg per day of the R-T-E cereal to hypercholesterolemic individuals for extended time periods. Optionally, the dosage can be administered in multiple doses, e.g., thrice daily, which collectively add up to the dosage levels specified. In individuals exhibiting hyper blood serum cholesterolemia, e.g., >220 mg/dl, an antihypercholesterolemic effect on the order of a 10% reduction can be expected after six weeks as part of a low fat, low cholesterol diet.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure. It will be appreciated that other modifications of the present invention, within the skill of those in the R-T-E cereal art, can be undertaken without departing from the spirit and scope of the invention.

EXAMPLE 1

A ready-to-eat cereal composition of the present invention having high levels of soluble fiber was prepared according to the following procedure. A dry blend, a wet blend, and a sugar coating composition were separately formed having the respective formulations:

| Ingredients | Weight % |
|---|---|
| A. Base Dry Blend | |
| Oat bran | 41.50 |
| Rice flour | 37.20 |
| Psyllium - 85% purity (i.e., 85% gum-containing husk) | 8.50 |
| Insoluble fiber (sugar beet fiber) | 6.30 |
| Wheat bran | 2.10 |
| Sucrose | 2.10 |
| Guar gum | 1.25 |
| Sodium bicarbonate | 0.35 |
| Trisodium phosphate | 0.30 |
| Vitamin blend | 0.08 |
| | 100.00% |
| B. Malt Syrup/Color Blend | |
| Malt syrup | 44.20 |
| Corn syrup | 4.10 |
| Food grade color | 11.60 |
| Potassium sorbate | 0.10 |
| | 100.00% |
| C. Sugar Slurry | |
| Sugar | 60.00 |
| Water | 28.20 |

-continued

| Ingredients | Weight % |
|---|---|
| Honey | 6.00 |
| Brown sugar syrup | 5.00 |
| Salt | 0.80 |
| | 100.00% |

About 2,000 lb (910 kg) of the base dry blend ingredients were blended for 15 minutes in a conventional ribbon blender equipped with a wet blend/dry blend bladed mixer. Sufficient amounts of the Malt/Color blend (about 34 lbs per 2000 lbs base) were added to the blended dry ingredients, and this mixture was further blended for an additional five minutes. The ingredients mixture was then fed to a Sprout-Waldren low pressure single screw cooker extruder equipped with a precooker conditioner with sufficient water to completely cook the mixture to a moisture content of about 38%. The residence time in the conditioner was about 30 min. The conditioner operating pressure was ambient pressure. The cooked cereal base was then extruded as several ropes of dough. The cooked dough ropes were then sheeted with standard cereal dough sheeting equipment. After sheeting, the cooked dough sheet was cut into strips, which in turn was cut again into cereal pieces approximately ½ inch by 3/16 inch to form pellets. The cooked cereal dough pellets were then dried in a conventional pellet dryer to a final moisture range of 22% to 27%, with a target moisture of 25%. The dried cereal pellets were then flaked with standard cereal flaking equipment to a final thickness of 0.018 to 0.022 inch. The wet flakes were then toasted in a cereal toaster at 400 degrees. Both the temperature and the residence time in the toaster can be varied to achieve the desired level of toasted flavor and color. The toasted flakes were then coated with sufficient sugar slurry to produce a final product with approximately 10% added slurry. The coated flakes were then dried to a final moisture of about 2.0%. The high soluble fiber R-T-E cereal so prepared was then conventionally packaged.

The final product had a soluble fiber content of 3.0 g/oz and an insoluble fiber content of 3.0 g/oz giving a soluble to insoluble fiber ratio of 1:1. The total fructose concentration of the sugar coated R-T-E cereal was about 4%. The total fat content was less than 4%. Upon consumption, the R-T-E cereal exhibited a clean flavor and texture profile that is typical of bran flavored cereals but is without a gummy, slimy mouthfeel.

In another embodiment, the R-T-E cereal additionally comprised raisins. In this embodiment, the R-T-E cereal flakes were prepared as described above except that the flakes after toasting and prior to sugar coating were hydrated to a moisture content of about 6%. This moisture adjustment is made so as to prevent moisture migration from the raisins to the cereal flakes which could undesirably result in hardened raisins and less crisp flakes.

EXAMPLE 2

A ready-to-eat cereal composition of the present invention having high levels of soluble fiber is prepared according to the following procedure. A dry blend, a wet blend and a sugar coating composition were separately prepared having the respective formulations:

| Ingredients | Weight % |
|---|---|
| A. Dry Base Blend | |
| Whole wheat | 66.32 |
| Psyllium - 85% purity | 15.00 |
| White wheat bran | 8.00 |
| Sugar | 7.50 |
| Salt | 1.50 |
| Guar gum | 1.20 |
| Vitamin blend | 0.40 |
| Trisodium phosphate | 0.08 |
| | 100.00% |
| B. Malt Syrup Slurry | |
| Water | 92.00 |
| Cereal malt syrup | 7.90 |
| Food coloring (e.g. Annatto) | 0.10 |
| | 100.00% |
| C. Sugar Slurry | |
| Sugar | 60.00 |
| Water | 28.20 |
| Honey | 6.00 |
| Brown sugar syrup | 5.00 |
| Salt | 0.80 |
| | 100.00% |

About 1,000 kg of dry base ingredients are blended for approximately 15 minutes in a conventional ribbon blender. The dry salt and sugar are weighed out separately and added to the malt syrup slurry mixture. The vitamin blend is also weighed out separately. Sufficient quantities of the malt syrup slurry (about 0.5 kg slurry for each kg of dry base mixture), are prepared in a conventional steam jacketed mixing kettle. The dry base and the prepared slurry are then added to a rotating batch cooker. The base and slurry mixture are then rotated for about 5 minutes to allow adequate mixing. The ingredients are then cooked for 55 minutes at 25 psig steam pressure with processing vents of pressure after 15 minutes and again after 35 minutes elapsed time. Following cooking, the cooked cereal dough is allowed to cool and pelletized in a pelletizing extruder (Ambrette Co.). The vitamin blend is metered into the cooled dough prior to pelleting extrusion at a rate sufficient to result in a final concentration in the cereal of 0.36%. The pellets are then dried in a conventional pellet dryer to a final moisture of 23% to 27%, with a target moisture of 25%. The dried pellets are then tempered for 45 to 60 minutes at ambient temperature in a conventional tempering belt system. The tempered pellets are then flaked using standard cereal flaking equipment to a thickness of about 0.018 to 0.023 inches. The wet flakes are then toasted at 400 degrees in a cereal toaster. The toasted flakes are then coated with sufficient sugar slurry to produce a final product with approximately 10% added slurry.

If desired, additional vitamins may be applied as described in Example 1. Application rates can be easily determined, depending on the final level of fortification required. Alternatively, the flakes may be executed with added raisins as in the previous example.

The final product has a soluble fiber content of 3.31 g/oz and an insoluble fiber content of 3.2 g/oz giving a soluble to insoluble fiber ratio of 1:1. The total fructose concentration of the sugar coated R-T-E cereal is about 5%. The total fat content is less than 2%. Upon consumption, the R-T-E cereal will exhibit a pleasing, typical bran cereal flavor and texture profile, without a gummy or slimy mouthfeel.

EXAMPLE 3

An R-T-E cereal of the present invention having high levels of soluble fiber is prepared according to the following procedure. A dry blend, a wet blend and a sugar coating composition were separately prepared having the respective formulations:

| Ingredients | Weight % |
|---|---|
| A. Dry Base Blend | |
| Yellow corn cones | 37.55 |
| Oat bran | 27.00 |
| Psyllium - 85% purity | 24.00 |
| Sugar | 5.00 |
| Heavy wheat bran | 4.00 |
| Guar gum | 1.20 |
| Salt | 0.50 |
| Sodium bicarbonate | 0.35 |
| Trisodium phosphate | 0.30 |
| Vitamin blend | 0.40 |
| | 100.00% |
| B. Malt Syrup/Color Blend | |
| Malt syrup | 44.20 |
| Corn syrup | 44.10 |
| Food grade color | 11.60 |
| Potassium sorbate | 0.10 |
| | 100.00% |
| C. Sugar Slurry | |
| Sugar | 60.00 |
| Water | 28.20 |
| Honey | 6.00 |
| Brown sugar syrup | 5.00 |
| Salt | 0.80 |
| | 100.00% |

About 1,000 kg of dry base are mixed, blended and processed as described in Example 1 to form R-T-E cereal flakes. The final moisture of the extruded ropes is about 35%. The sugar coating processes are the same as those given in previous examples.

The final product has a soluble fiber content of 5.4 g/oz and an insoluble fiber content of 1.8 g/oz giving a soluble to insoluble fiber ratio of 3:1. The total fructose content of the sugar coated flake is less than 5%. The total fat content was less than 4%.

EXAMPLE 4

An R-T-E cereal of the present invention is prepared according to the following procedure:

| Ingredients | Weight % |
|---|---|
| A. Dry Base Blend | |
| Oat bran | 30.00 |
| Yellow corn cones | 28.00 |
| Psyllium - 85% purity | 16.00 |
| High methoxyl pectin | 13.50 |
| Dent corn starch | 9.60 |
| Guar gum | 1.20 |
| Salt | 0.50 |
| Sodium bicarbonate | 0.50 |
| Vitamin blend | 0.40 |
| Trisodium phosphate | 0.30 |
| | 100.00% |

-continued

| Ingredients | Weight % |
|---|---|
| B. Corn Syrup Blend | |
| High fructose corn syrup | 99.60 |
| Food coloring | 0.40 |
| | 100.00% |
| C. Aspartame Sweetener | |
| Water | 97.00 |
| Aspartame | 2.70 |
| Xanthan gum | 0.30 |
| | 100.00% |

About 1,000 kg of the dry base mixture is blended in conventional ribbon blender. The corn syrup blend is mixed separately. The cereal base is cooked in a high-temperature, short-time (HTST) single screw extruder cooker (Wenger Inc.) equipped with a steam injected conditioner. The extruder is fitted with a die configuration that will produce about 30 to 40 individual ropes of cooked dough, each being approximately 0.12 inches in diameter. Sufficient water is added to the extruder to achieve a moisture of about 15% to 20% in the extruded dough. The corn syrup blend is pumped into the conditioner with a pump suitable for delivery of viscous fluids, and at a rate sufficient to result in a final product with approximately 8% added corn syrup. The color level in the blend may be adjusted as desired. The individual extruded ropes are then cut to desired length with a suitable high-speed cutter. The cut cereal pieces are then toasted at about 400 degrees in a conventional cereal toaster. Following toasting, the cereal pieces are coated with the high-potency artificial sweetener. The aspartame mixture is homogenized, and atomized onto the surface of the cereal at a rate sufficient to produce a final product with about 0.04% added aspartame. An additional vitamin mix may be applied here as described in Example 1. The high soluble fiber R-T-E cereal so prepared was conventionally packaged.

The final product has a soluble fiber content of 6.4 g/oz and an insoluble fiber content of 1.3 g/oz giving a soluble to insoluble fiber ratio of 5:1. The total fructose content of the cereal is about 3% to 4%. The total fat content was less than 4%.

What is claimed is:

1. A ready-to-eat (R-T-E) cereal high in total dietary fiber, comprising a cereal composition including:

A. about 2% to 37% by weight of the cereal composition of psyllium having a soluble fiber content of at least about 65% by weight;

B. about 20% to 80% by weight of the cereal composition of a starchy cereal ingredient;

C. sufficient amounts of an insoluble fiber source so as to provide the cereal composition with a weight ratio of soluble fiber to insoluble fiber of about 1 to 5:1;

D. a moisture content of about 1% to 6% by weight of the cereal composition; and wherein the total fructose content is less than about [5] *15%* by weight, and wherein the minimum soluble fiber content is about 3 g/oz of the cereal composition.

2. The R-T-E cereal of claim 1 wherein the cereal composition additionally comprises:

E. about 10% to 60% by weight of the cereal composition of oat flour or oat bran.

3. The R-T-E cereal of claim 2 wherein the weight ratio of soluble fiber to insoluble fiber is at least 3:1.

4. The R-T-E cereal of claim 3 wherein the cereal composition comprises about 3 to 6 g/oz of soluble fiber.

5. The R-T-E cereal of claim 4 wherein the cereal composition includes about 0.1% to 15% by weight of the cereal composition of a soluble fiber source member selected from the group consisting of guar gum, carboxymethyl cellulose, high methoxyl pectin, and mixtures thereof.

6. The R-T-E cereal of claim 5 wherein the insoluble fiber source includes a member selected from the group consisting of sugar beet fiber, wheat bran, corn bran, rice bran, barley bran and mixtures thereof.

7. The R-T-E cereal of claim 6 additionally comprising:

F. about 1% to 30% by weight of the cereal composition of a nutritive carbohydrate sweetening agent.

8. The R-T-E cereal of claim 7 containing a sugar coating.

9. The R-T-E cereal of claim 8 containing about 4 to 6 g/oz soluble fiber, and wherein the R-T-E cereal is in flake form, wherein the water activity ranges from about 0.1 to 0.3, wherein the weight ratio of soluble fiber to insoluble fiber is greater than 5:1, and wherein the cereal is fortified with calcium, reduced iron and riboflavin.

10. A method for preparing an R-T-E cereal of good eating quality and high levels of soluble fiber, comprising the steps of:

A. forming an homogeneous cereal blend comprising (1) about 5% to 37% by weight of psyllium having a soluble fiber content of at least 65% by weight, (2) about 20% to 80% by weight of a starchy cereal ingredient, (3) sufficient amounts of an insoluble fiber source so as to provide the blend with a weight ratio of soluble fiber to insoluble fiber of about 1 to 5:1, (4) about 20% to 40% by weight water, the weight percents of ingredients (1) to (3) being based on the total dry weight of the cereal blend, wherein the minimum soluble fiber content of the blend is about 3 g/oz (dry weight basis), wherein the total fructose content (dry weight basis) is less than about [5] *15%* by weight of the blend, and wherein the total fat content is less than about 5% by weight (dry weight basis);

B. cooking the blend with steam at a steam pressure of about 2 to 35 psig for about 5 to 30 minutes to form a cooked cereal using low shear agitation;

C. extruding the cooked cereal with low shear mixing to form a cooked cereal dough extrudate;

D. forming the cooked cereal dough extrudate into sized shapes and pieces; and

E. drying the pieces to a water activity of about 0.1 to 0.30 to form R-T-E cereal pieces.

11. The method of claim 10 wherein the cereal blend additionally comprises (5) about 10% to 60% by weight of oat flour or oat bran.

12. The method of claim 11 wherein the weight ratio of soluble fiber to insoluble fiber is at least 1.5:1.

13. The method of claim 12 wherein the blend includes about 0.1% to 15% by weight of the blend of a soluble fiber source member selected from the group consisting of guar gum, carboxymethyl cellulose, high methoxyl pectin, and mixtures thereof.

14. The method of claim 13 wherein the moisture content of the cooked cereal blend ranges from about 25% to 35% by weight, wherein in step D, the method includes the substep of forming flaked pieces, and wherein in step [F] *E*, the method includes the substep of toasting the flaked pieces to form toasted, dried flaked R-T-E pieces.

15. The method of claim 14 wherein the method further includes:

G. providing a sugar coating to the flaked R-T-E pieces.

16. A method for lowering plasma cholesterol levels comprising administering to a human susceptible to or afflicted with hypercholesterolemia an R-T-E cereal composition of claim 1 and wherein the R-T-E cereal is administered to provide about 0.5 to 1.5 g of cereal per kilogram of body weight per day over an extended period of time.

17. A method for lowering plasma cholesterol levels comprising administering to a human susceptible to or afflicated with hypercholesterolemia an R-T-E cereal composition of claim 2 and wherein the R-T-E cereal is administered to provide about 0.5 to 1.5 g of cereal per kilogram of body weight per day over an extended period of time.

18. A method for lowering plasma cholesterol levels comprising administering to a human susceptible to or afflicted with hypercholesterolemia an R-T-E cereal composition of claim 8 and wherein the R-T-E cereal is administered to provide about 0.5 to 1.5 g of cereal per kilogram of body weight per day over an extended period of time.

*19. A ready-to-eat (R-T-E) cereal high in total dietary fiber, comprising a cereal composition including:*

*A. about 2% to 37% by weight of the cereal composition of psyllium having a soluble fiber content of at least about 65% by weight;*

*B. about 20% to 80% by weight of the cereal composition of a starchy cereal ingredient;*

*C. sufficient amounts of an insoluble fiber source so as to provide the cereal composition with a weight ratio of soluble fiber to insoluble fiber of about 0.5 to 5:1;*

*D. a moisture content of about 1% to 6% by weight of the cereal composition; and*

*wherein the total fructose content is less than about 15% by weight and the minimum soluble fiber content is about 3 g/oz of the cereal composition.*

*20. The R-T-E cereal of claim 19 wherein the cereal composition additionally comprises:*

*E. about 10% to 60% by weight of the cereal composition of oat flour or oat bran.*

*21. The R-T-E cereal of claim 20 wherein the cereal composition includes as a soluble fiber source at least one member selected from the group consisting of guar gum, carboxymethyl cellulose, and high methoxyl pectin.*

*22. The R-T-E cereal of claim 21 wherein the insoluble fiber source includes at least one member selected from the group consisting of sugar beet fiber, wheat bran, corn bran, rice bran, and barley bran.*

*23. The R-T-E cereal of claim 22 additionally comprising:*

*F. about 1% to 30% by weight of the cereal composition of a nutritive carbohydrate sweetening agent.*

*24. The R-T-E cereal of claim 23 containing a sugar coating.*

*25. A method for preparing an R-T-E cereal of good eating quality and high levels of soluble fiber, comprising the steps of:*

*A. forming an homogeneous cereal blend comprising*

*(1) about 5% to 37% by weight of psyllium having a soluble fiber content of at least 65% by weight,*

*(2) about 20% to 80% by weight of a starchy cereal ingredient,*

(3) sufficient amounts of an insoluble fiber source so as to provide the blend with a weight ratio of soluble fiber to insoluble fiber of about 0.5 to 5:1, (4) about 20% to 40% by weight water, the weight percents of ingredients (1) to (3) being based on the total dry weight of the cereal blend, wherein the minimum soluble fiber content of the blend is about 3 g/oz (dry weight basis), wherein the total fructose content (dry weight basis) is less than about 15% by weight of the blend, and wherein the total fat content is less than about 5% by weight (dry weight basis);

B. cooking the blend with steam at a steam pressure of about 2 to 35 psig for about 5 to 30 minutes to form a cooked cereal using low shear agitation;

C. extruding the cooked cereal with low shear mixing to form a cooked cereal dough extrudate;

D. forming the cooked cereal dough extrudate into sized shapes and pieces; and

E. drying the pieces to a water activity of about 0.1 to 0.30 to form R-T-E cereal pieces.

26. The method of claim 25 wherein the cereal blend additionally comprises (5) about 10% to 60% by weight of oat flour or oat bran.

27. The method of claim 26 wherein the blend includes as a soluble fiber source at least one member selected from the group consisting of guar gum, carboxymethyl cellulose, and high methoxyl pectin.

28. The method of claim 27 wherein the moisture content of the cooked cereal blend ranges from about 25% to 35% by weight, wherein in step D, the method includes the substep of forming flaked pieces, and wherein in step E, the method includes the substep of toasting the flaked pieces to form toasted, dried flaked R-T-E pieces.

29. The method of claim 28 wherein the method further includes:

G. providing a sugar coating to the flaked R-T-E pieces.

30. A method for lowering plasma cholesterol levels comprising administering to a human susceptible to or afflicted with hypercholesterolemia an R-T-E cereal composition of claim 19 and wherein the R-T-E cereal is administered to provide about 0.5 to 1.5 g of cereal per kilogram of body weight per day over an extended period of time.

31. A method for lowering plasma cholesterol levels comprising administering to a human susceptible to or afflicted with hypercholesterolemia an R-T-E cereal composition of claim 20 and wherein the R-T-E cereal is administered to provide about 0.5 to 1.5 g of cereal per kilogram of body weight per day over an extended period of time.

32. A method for lowering plasma cholesterol levels comprising administering to a human susceptible to or afflicted with hypercholesterolemia an R-T-E cereal composition of claim 24 and wherein the R-T-E cereal is administered to provide about 0.5 to 1.5 g of cereal per kilogram of body weight per day over an extended period of time.

* * * * *